United States Patent
Parrin et al.

(10) Patent No.: US 9,616,800 B2
(45) Date of Patent: Apr. 11, 2017

(54) METHOD AND SYSTEM FOR SECURING HEAVY LOADS

(71) Applicant: CORDSTRAP B.V., Oostrum (NL)

(72) Inventors: David John Parrin, Helmond (NL); Remco Cornelis Willemse, Weert (NL); Scott D Loudon, II, N. Canton, OH (US)

(73) Assignee: Cordstrap B.V. (NL)

( * ) Notice: Subject to any disclaimer, the term of this patent is extended or adjusted under 35 U.S.C. 154(b) by 0 days.

(21) Appl. No.: 14/866,135

(22) Filed: Sep. 25, 2015

(65) Prior Publication Data

US 2016/0031359 A1 Feb. 4, 2016

Related U.S. Application Data

(63) Continuation-in-part of application No. PCT/EP2014/056102, filed on Mar. 26, 2014.

(30) Foreign Application Priority Data

Mar. 28, 2013 (NL) ........................... 1040133

(51) Int. Cl.
*B61D 45/00* (2006.01)
*B60P 7/08* (2006.01)
*B65D 90/00* (2006.01)

(52) U.S. Cl.
CPC ........... *B60P 7/0807* (2013.01); *B60P 7/0823* (2013.01); *B65D 90/0053* (2013.01); *B65D 2590/0058* (2013.01)

(58) Field of Classification Search
CPC .............................. B61D 45/001; B61D 45/00
(Continued)

(56) References Cited

U.S. PATENT DOCUMENTS 2,081,323 A * 5/1937 Cordes ................ F16B 13/0808
411/342
3,178,790 A * 4/1965 Cech ..................... B60P 7/0815
410/115
(Continued)

FOREIGN PATENT DOCUMENTS

DE 4340683 C1 3/1995
DE 8423085.1 12/2007
(Continued)

OTHER PUBLICATIONS

International Searching Authority (European Patent Office), International Search Report and Written Opinion (PCT/EP2014/056102), Jul. 25, 2014.

*Primary Examiner* — H Gutman
(74) *Attorney, Agent, or Firm* — McGuireWoods LLP

(57) ABSTRACT

The current invention concerns a method and device for securing cargo load in a container. In an embodiment of the current invention, such method comprises: providing a wall securement device comprising two or more apertures allowing the passage of securing means such as straps, which wall securement device is attached to an inner rigid structure of the wall; and lashing the cargo load with securing means by use of the wall securement device, whereby the wall securement device is located at the corner post of said container. In a second aspect, the current invention provides for a wall securement device for securing loads.

24 Claims, 10 Drawing Sheets

(58) Field of Classification Search
USPC .......................................................... 410/98
See application file for complete search history.

(56) References Cited

U.S. PATENT DOCUMENTS

| | | | | |
|---|---|---|---|---|
| 3,302,508 | A * | 2/1967 | Topf .................... | F16B 13/0808 411/341 |
| 3,917,338 | A * | 11/1975 | Becker .................. | B60P 7/0815 105/423 |
| 4,418,450 | A * | 12/1983 | Nelson .................. | B60P 7/0823 108/55.5 |
| 4,531,774 | A * | 7/1985 | Whatley .................. | B60R 9/00 224/404 |
| 4,812,093 | A * | 3/1989 | Millar, Jr. ............. | B60P 7/0807 105/390 |
| 4,850,770 | A * | 7/1989 | Millar, Jr. ............ | B61D 45/001 410/110 |
| 5,020,948 | A | 6/1991 | Ihara | |
| 5,051,047 | A * | 9/1991 | Loncaric ............... | B60P 7/0815 24/265 CD |
| 6,824,341 | B2 * | 11/2004 | Ehrlich ................ | B62D 33/046 296/191 |
| 7,556,463 | B1 * | 7/2009 | Hall ...................... | B60P 7/0815 410/104 |
| 7,841,815 | B1 | 11/2010 | Lane | |
| 8,356,962 | B2 * | 1/2013 | Crook ...................... | B60P 3/08 410/16 |
| 2006/0153659 | A1 | 7/2006 | Spradlin | |
| 2006/0222455 | A1 * | 10/2006 | Senakiewich ......... | B60P 7/0815 403/252 |
| 2012/0189382 | A1 * | 7/2012 | Health .................. | B60P 7/0815 403/349 |
| 2014/0003878 | A1 * | 1/2014 | Knox .................... | B60P 7/0807 410/104 |

FOREIGN PATENT DOCUMENTS

| | | |
|---|---|---|
| DE | 202007014254 U1 | 12/2007 |
| DE | 102011111502 A1 | 2/2013 |
| EP | 0177442 A2 | 4/1986 |
| EP | 1980169 A2 | 10/2008 |
| EP | 2169259 A1 | 3/2010 |

* cited by examiner

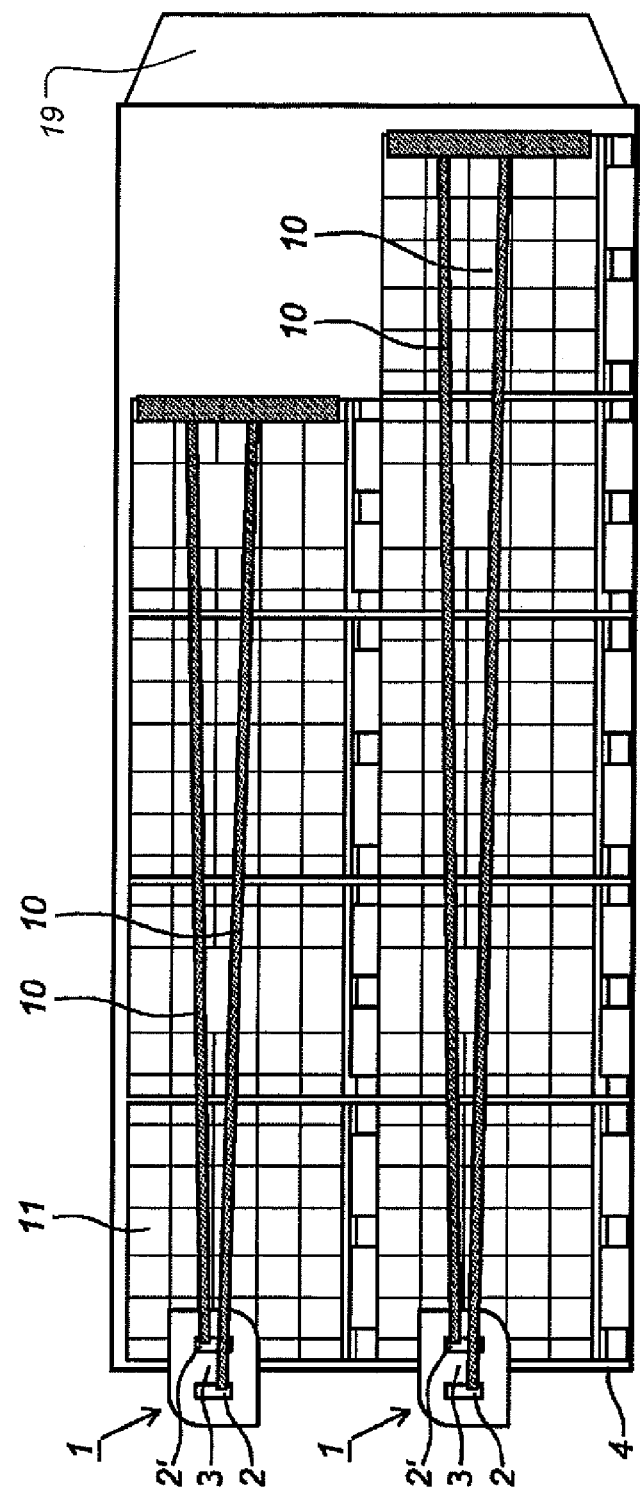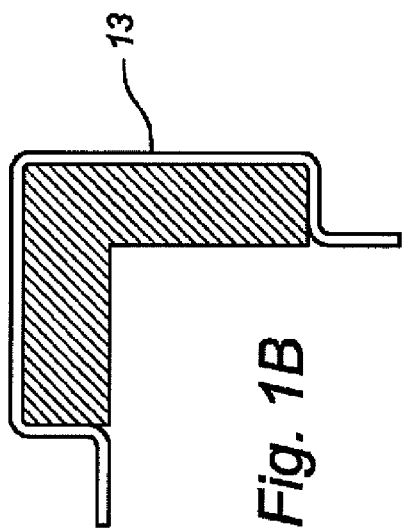
Fig. 1A
Fig. 1B

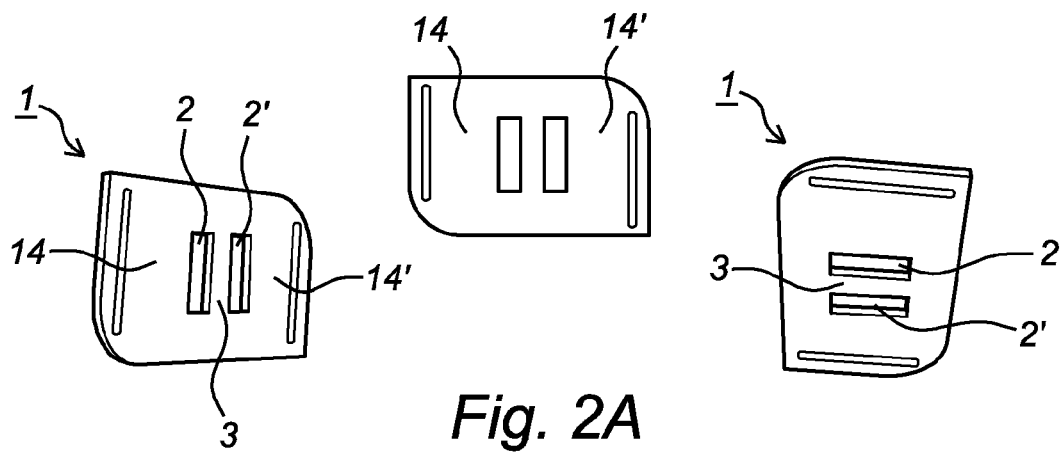
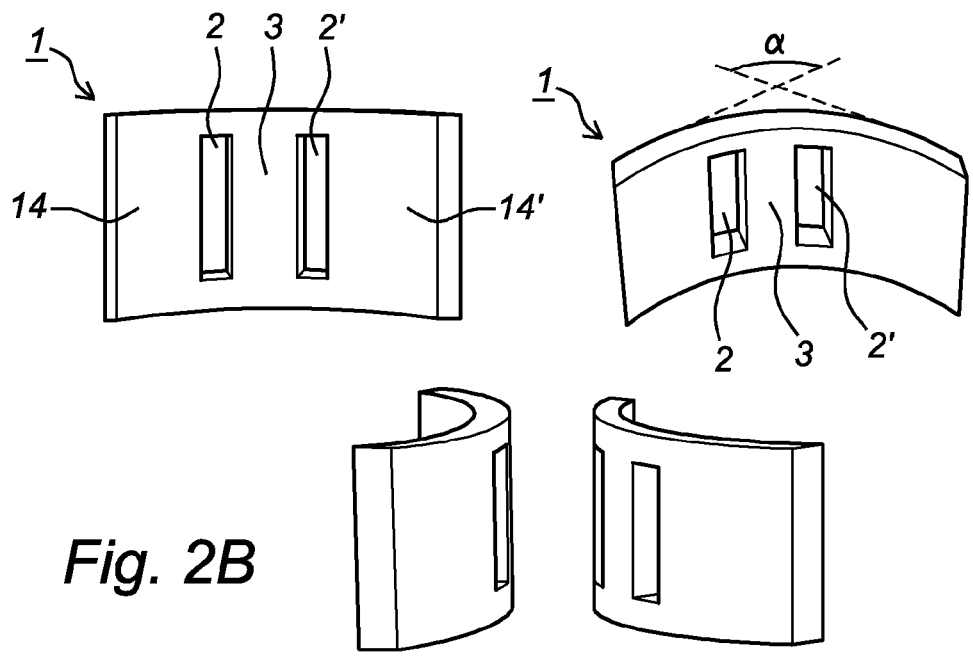
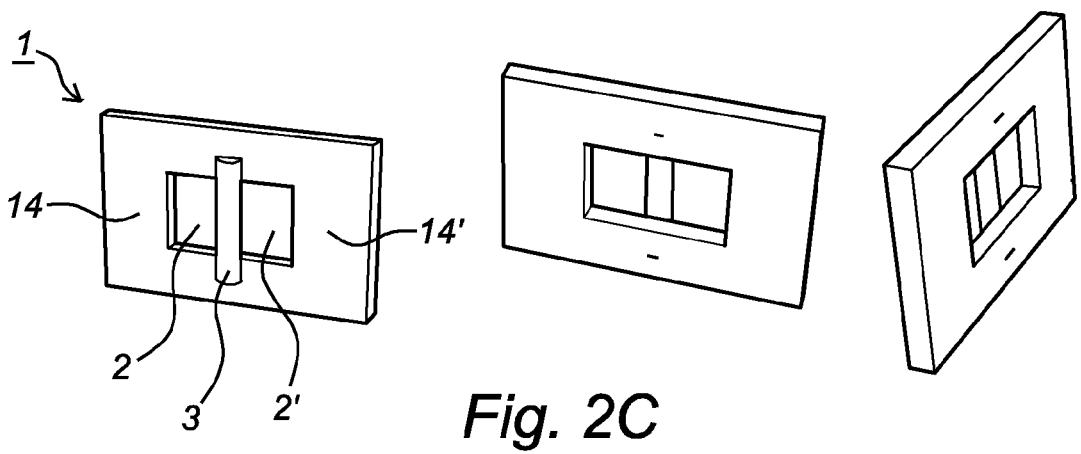
Fig. 2A
Fig. 2B
Fig. 2C

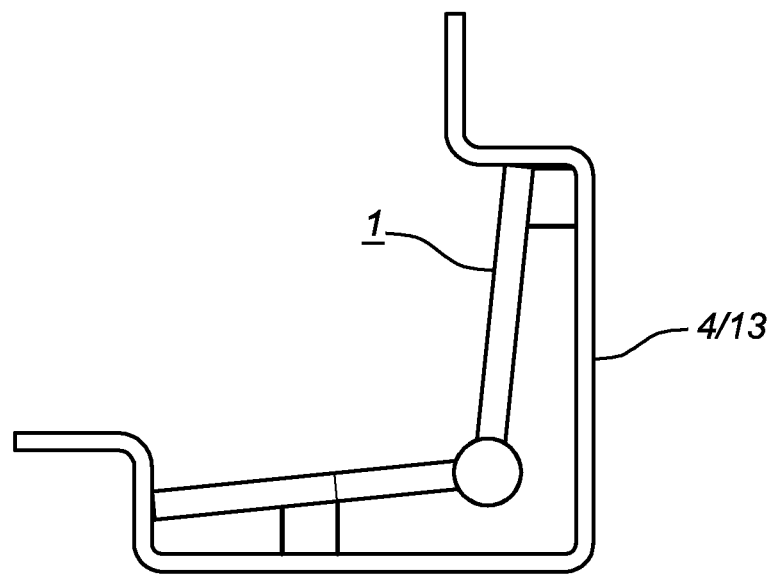
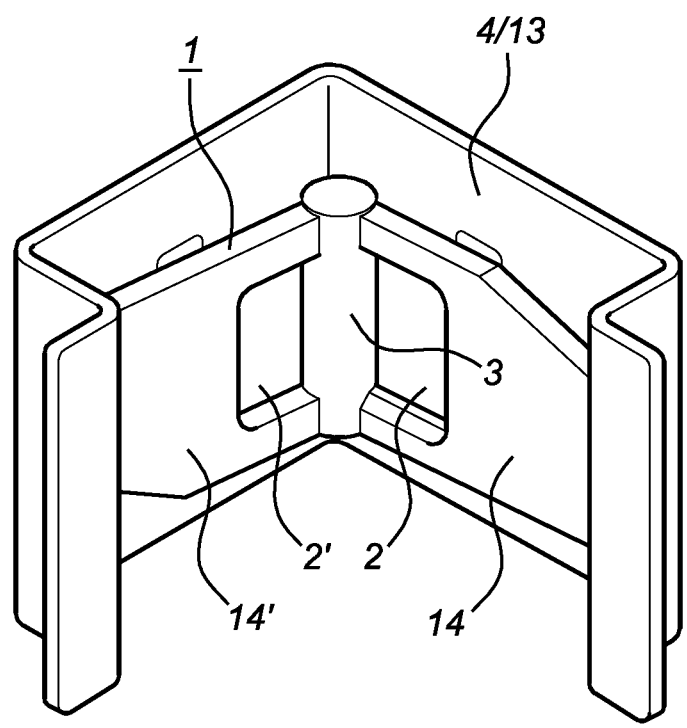
Fig. 3C

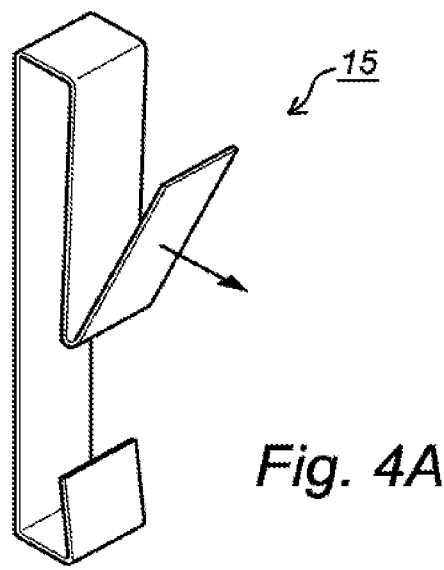
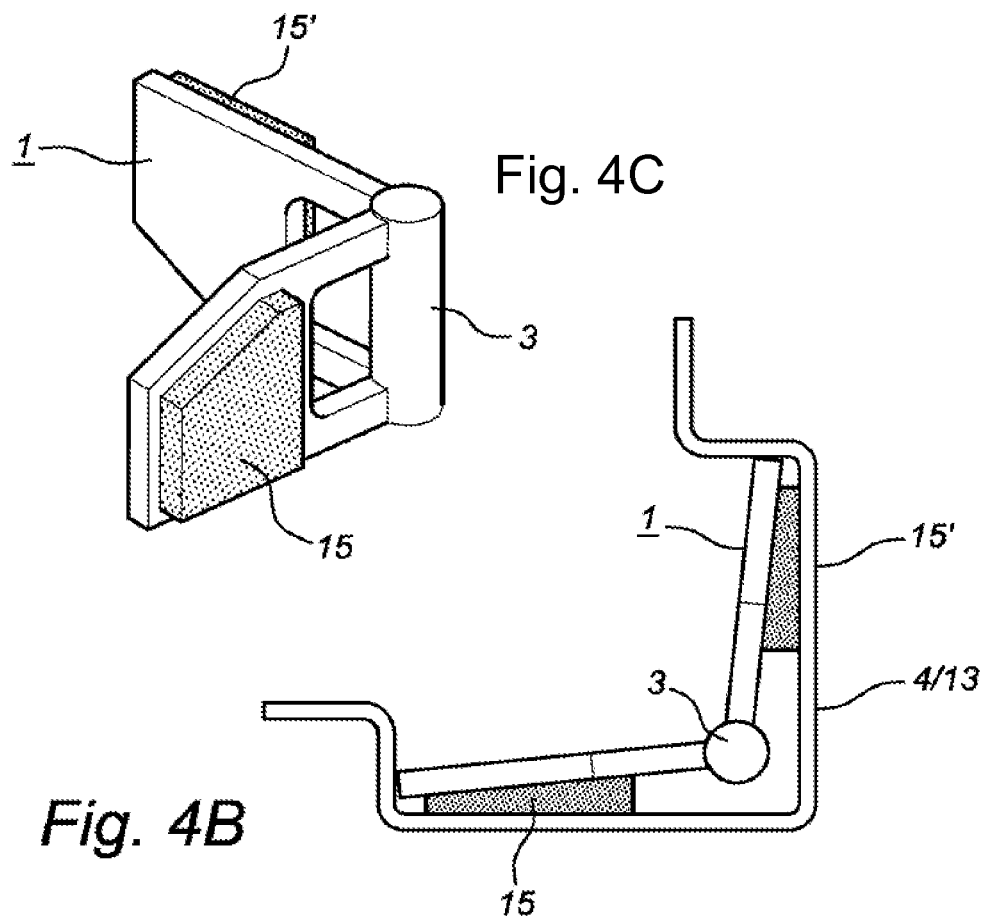

METHOD AND SYSTEM FOR SECURING HEAVY LOADS

CROSS-REFERENCE TO RELATED APPLICATION

This application is a continuation-in-part of International Application No. PCT/EP2014/056102, filed on Mar. 26, 2014, designating the United States of America, which is based on and claims priority of Netherlands Patent Application No. 1040133, filed Mar. 28, 2013. The entire disclosures of both of the foregoing patent applications, including the specifications, drawings, and claims, are fully incorporated herein by reference.

TECHNICAL FIELD

The invention pertains to the technical field of methods and systems for securing heavy loads in a container.

BACKGROUND

Cargo stowed in ocean shipping containers must be secured to prevent shifting in any direction, particularly towards the doors. Voids between individual cargo units and/or container walls must be filled and/or cargo can be secured against falling, tipping and sliding by using multiple lashing and anchor points provided on the top and bottom side rails and on the corner posts. These lashing points generally comprise of rings (e.g. D-rings) which allow the passage of straps or ropes used for securing the load. Most ocean shipping containers, except for refrigerated containers ("reefers") provide multiple lashing and anchor points. U.S. Pat. No. 6,666,635 describes an example of a load securement method for cargo making use of b-rings or other lashing points. U.S. Pat. No. 7,841,815 also describes a cargo restraint system comprising conventional tie down rings. During securing of cargo prior to transport, problems arise if the condition of the lashing points is compromised due to rust, wear and tear or deformation. Their strength restricts the weight of the cargo that can be secured: as per the ISO 1496-1:1990, the rated maximum Safe Working Load (SWL) or Lashing Capacity (LC) is only between 500 and 1,000 daN per lashing point ("Each anchor point shall be designed and installed to provide a minimum rated load of 1000 kg applied in any direction, and each lashing point shall be designed and installed to provide a minimum rated load of 500 kg applied in any direction"). Exceeding the rated strength of the lashing points, either through forces of cargo in transit or using lashing materials with a higher strength rating may lead to regulatory authorities rejecting the container for (ocean) transportation, resulting in lost time and additional cost of re-loading and securing. The latter implies a considerable loss in time and money for the cargo companies and/or the principal for the transport, not to mention the negative impact it has on the companies offering securing services to these cargo companies.

U.S. Pat. No. 5,020,948 describes a belt fitting engagement rail mounted to the side of a container for securing a belt fitting attached at the end of a belt. The system of U.S. '948 is not suitable for securing heavy loads.

Containers should be packed and cargo secured in accordance with the IMO/ILO/UN ECE Guidelines for packing of cargo transport units (CTUs). These CTU packing guidelines are published by the International Maritime Organization (IMO) and International Labor Organization (ILO).

Finally, securing cargo by use of lashing points is cumbersome. In general, cargo will be secured by straps which extend in vertical and horizontal directions. This may lead to a very complicated strapping situation with use of a substantial amount of material, which is preferably to be avoided.

There remains a need in the art for an alternative system to the currently known securing methods making use of these lashing and anchor points. By preference, such alternative should be time and money saving, easy to use and have the potential to be generally accepted by International Regulatory Authorities. The present invention aims to provide a method and system for securing goods which will resolve at least some of the problems mentioned above.

SUMMARY OF THE INVENTION

According to the current invention, a non-limiting method and device for securing a load in a container are disclosed. The method makes use of a device that may be positioned in a corner profile of a container. The device is provided with apertures for receiving securing means and which aid in adequate securing. The method allows easy and accurate securing of a load, and provides for a better alternative than the methods and device currently used for securing loads in containers.

According to an aspect of the invention, a method is provided for securing a cargo load in a container whereby the container comprises three side walls, a door (or door leaf), a roof, a floor and four corner posts. The method comprises: providing a securement (or wall securement) device comprising two or more apertures allowing the passage of securing means such as straps, which securement device is attached to an inner rigid structure of the wall; lashing the cargo load with securing means by use of the securement device; characterized in that the securement device is located at the corner post of the container.

The method is characterized in that: the securing means may run substantially perpendicular to said posts; the securement device may be fixedly attached to the wall; the securement device may be removably attached to the wall; the securement device may be adjustable in position, more specifically adjustable in height; one securement device may be provided; two securement devices may be provided per corner post; three or more securement devices may be provided per corner post; during lashing of the load, the securing means may be passed through a first aperture of the wall securement device and subsequently through a second aperture of the same wall securement device in a direction that may be opposite to the first path of the securing means; the securement device may be located at the front wall of the container, opposite to the doors of the container; and/or the container may be located on transport means.

According to another aspect of the invention, a securement device is provided for securing a cargo load in a container, attachable to an inner rigid structure of the container. The securement device has two or more apertures allowing the passage of securing means such as straps, characterized in that the apertures may be separated by an intersection for supporting the securing means when passed through the apertures, whereby the intersection may be placed in a plane reverse to the direction of strain of the securing means.

The securement device is characterized in that: the apertures may comprise between about 10 and 80%, preferably between about 25 and 60% of the total surface of the securement device; the securement device may have two apertures; each aperture may be located in a plane of the securement device, whereby the planes may form an inner angle of between about 45° and about 180°, and preferably between about 90° and about 180°, and more preferably between about 100° and about 110°; the securement device may be provided with a peripheral roughening; the peripheral roughening may be located at the intersection; the securement device may be provided by means for attaching the device to a load surface such as a container; and/or the securement device may be implanted for securing a cargo load in a container.

According to a further aspect of the invention, a container is provided with one or more wall securement devices, constructed according to the principles of the invention.

According to a still further aspect of the invention, a kit is provided that comprises a securement device according to the invention, and a securing means such as straps and a buckle for joining the securing means. As understood by those skilled in the art, the securing means may include any type of mechanism that may be attached to the securing device according to the principles of the invention. The kit is characterized in that: the securing means may include straps comprising polyester yarns; the strap(s) may comprise woven polyester yarns; the strap(s) may comprise composite polyester yarns that may be embedded in a polymer coating, wherein the polymer coating may include polypropylene; the buckle may comprise a body having two side walls and bars extending between these side walls; the bars of the buckle may be provided with a peripheral roughening; at least one of the bars may be provided with a peripheral roughening comprising a serration that may be oriented opposite the strap's direction of strain; and/or the kit may comprise a tensioner for applying a tension on the securing means.

DESCRIPTION OF FIGURES

FIG. 1A shows an example of a cargo load lashed by an embodiment of the method and device according to the current invention. FIG. 1B shows a schematic overview of a corner post profile of a container with indication of the preferred position of said device according to the current invention.

FIGS. 2A to 2F show potential embodiments of a wall securement device according to the current invention.

FIGS. 3B and 3C show a detail of a corner post/corner profile of a container, which is suitable for receiving an embodiment of the wall securement device according to the current invention, as well as examples of mounting different embodiments of these devices to the corner posts.

FIGS. 4A to 4C show attachment aids according to possible embodiments of the current invention.

DETAILED DESCRIPTION OF THE INVENTION

Figure 2D:
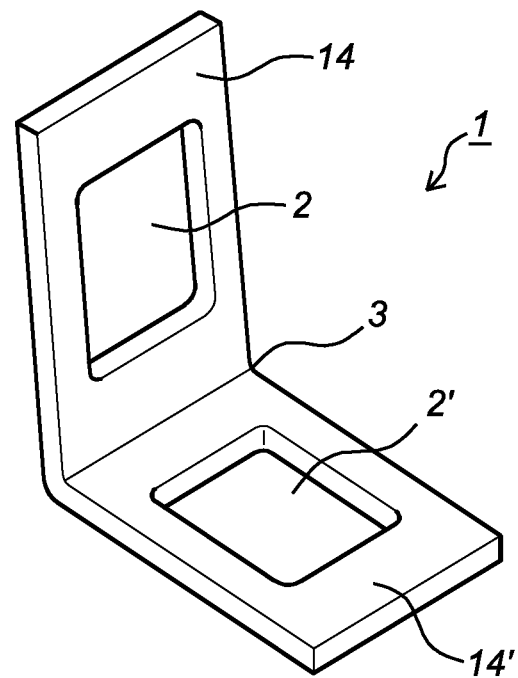

The present invention concerns a method for securing cargo load in a container as well as a wall securement device capable to be used in this method. The latter enables an easy and time-saving way to securing goods to a container, thereby ensuring that the latter are adequately secured. Moreover, it is the purpose of the current invention to provide an alternative for the well-known lashing and anchor points of the prior art, such as D-rings. It is the aim of the current invention to provide a system which is thus reliable that it will pass all regulatory requirements and hence may be used for a variety of loads which are currently excluded by the prior art lashing points. Moreover, it is also the object of the current invention to provide a method and system which is cost-saving for the client.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "wall" may include a wall and a corner post.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

In a first aspect, the current invention provides for a method for securing cargo load in a container. In an embodiment of the invention, the method comprises the following steps:

providing a wall securement device comprising two or more apertures allowing the passage of securing means such as straps, attached to an inner rigid structure of a load surface such as a container; and lashing the cargo load with securing means to the container by use of the wall securement device.

The method is specifically suited for lashing loads in heavy freight in containers which are located on transport means. By preference such transport means may be a waterborne vessel such as a container ship, ground vehicle such as truck or railcar, or an airborne vessel such as an airplane.

These wall securement devices are to be attached to the inner structure, being the inner wall of the container and will serve as anchoring or passage points for securing means used for lashing the cargo load. In a preferred embodiment, said wall securement device is attached to the corner posts of the container. By preference, said device is attached to the corner profile of such corner posts. Containers comprise a steel framework, consisting of four corner posts. These corner posts serve as the load-carrying elements of containers. The steel framework furthermore comprises two bottom side rails, two top side rails, two bottom cross members, a front top end rail and a door header. The side and end walls and the roof are the components of a standard box container which are capable of bearing the least load. The corner posts provide enough strength for allowing the attachment of the wall securement device according to the current invention, thereby equally providing sufficient sturdy points to allow the anchorage of securing means and bearing the load. Attachment may be physical or mechanical. Attachment may include the physical clamping of the device to the corner profile of the corner post. This ensures also that the device does not hinder or interfere with the cargo within the container. In an embodiment of the current invention, the wall securement device may be removably attached to the container. With the term "removably attached" is meant the device is connected to the wall by means which allow easy attachment or detachment, without the use of tools such as screwdrivers, nails, screws and the like. Such removable attachment may comprise one or more attachment aids such as adhesive strips, glue or glue-like material or make use of magnetic force. In a preferred embodiment, said attachment aid comprises a clamp, a spring or a foam, which is positioned between the wall of the corner post and the device. Most preferably, said attachment aid is a foam element, connected to the rear of said device. Said foam element comprises preferably compressible foam.

Alternatively, said wall securement device may be permanently fixed to the container by conventional means such as welding.

The wall securement device may be adjustable in position, meaning that the position of the device may be adjusted in view of the top and bottom of the container, e.g. lowered or increased. For the latter purpose, a rail system may be provided at the corner posts, with fastening means for the device onto the rail which allows altering the position of the device with respect to top of bottom of the container.

In a preferred embodiment, the securement devices are located in one vertical plane in view of the roof or floor wall of the container, meaning that they are all provided at one side of the container. By preference, they are provided at the corner posts at the end wall of the container opposite to the door(s). In the most preferred configuration, each corner post of this end wall will be provided by at least one wall securement device. By preference, 2 devices are provided at each corner post, whereby one of the devices is preferably located towards the top of the container and one located towards the floor of the container.

During lashing of the load, securing means are passed through a first aperture of the wall securement device and subsequently through a second aperture of said same wall securement device in a direction opposite to the first path of said securing means. Such securing means are by preference straps, such as steel straps, polypropylene straps or polyester straps with or without a polymer coating. By preference, the system and method is used in conjunction with polyester straps, comprising polyester yarns, either woven or composite yarns. Straps produced of composite yarns will by preference be coated in a polymer coating such as polypropylene or polyethylene. The loose ends of the securing means are joined by means of a buckle. By preference, such a buckle is manufactured from high quality steel and is provided by measures that avoid or entirely prevent slipping.

In a preferred embodiment, said wall securement device can bear a load of at least 6 ton (absolute value) when provided with securing means. The applied force on the securing means will run opposite to the direction of the first path of the securing means and parallel to the second path.

In a second aspect, the current invention provides for a wall securement device for use in above-mentioned method. The wall securement device is specifically designed to be attached to a corner post and to fit in the corner profile of said post. The wall securement device may be manufactured from metals such as high quality steel, stainless steel, aluminum or plastic. In a preferred embodiment, the wall securement device has two or more apertures allowing the passage of securing means such as straps. These apertures are separated by an intersection, used as support for the straps when passed through these apertures. Said apertures are part of separate leafs of the device. Said intersection may comprise a flat, a rounded or rugged element. In a preferred embodiment, said intersection comprises a cylindrical element such as a bar or rod. In an embodiment, this intersection is located in a plane reverse to the direction of strain of said securing means. As such, the device provides both for an anchorage point for the strap as well as for a load bearing point. The position of the intersection in view of the strain direction is chosen such that the straps are given an adequate support by the intersection during lashing.

The device and preferably the region of the intersection may be provided by a peripheral roughening. Such peripheral roughening or abrasive surface may comprise for instance a specific pattern (e.g. grid), embossed in the material of the intersection or by coating the intersection or entire device by a grit material coating. Such peripheral roughening will prevent slipping of the strap. The device may furthermore also be provided by means for attachment to a load surface. Attachment to the container may be removable or permanent.

As pointed out, the wall securement device is provided by apertures for passage of the straps. By preference, each of the wall securement devices has two apertures. In one embodiment, the apertures comprise between 10 and 80%, of the total surface of said wall securement device. By preference, said apertures comprise between 25 and 60% of the total surface of the device. The latter ensures easy passage and even multiple passages of the straps through the apertures, meanwhile ensuring that the device still withstands the forces applied onto the device when cargo is secured by aid of the devices.

In a further embodiment, each aperture is located in a plane of said wall securement device, said planes are virtual planes formed by the separate leafs of the device, whereby said planes form an inner angle $\alpha$ of between 45° and 180°, preferably between 90 and 180°, more preferably between 100° and 180°, more preferably between 100° and 150°, more preferably between 100° and 120°, even more preferably between 100° and 110°. Hence, the latter allows for a specific configuration of the device allowing attachment of the device to the wall of the corner posts of the container.

By preference, said device comprises two leafs, which are connected to each other at the level of the intersection. Said leafs preferably form an angle of between 45° and 180°, preferably between 90 and 180°, more preferably between 100° and 180°, more preferably between 100° and 150°, more preferably between 100° and 120°, even more preferably between 100° and 110°. In a most preferred embodiment, said angle comprises between 100° and 105°, such as 100°, 101°, 102°, 103°, 104° or 105°. It was found by the inventors that an angle in this range allows adequate positioning of the device to the corner post, as well as ensures passing of the securing means through the apertures.

In an embodiment, said leaf of the device comprises a substantially rectangular form. In another embodiment, said leaf comprises a polygon form. In a preferred embodiment, said leaf comprises at least two sides, which intersect and form an obtuse angle at the intersection. As a consequence, said leafs comprise a beveled edge. Said obtuse angle comprises between 91° and 178°, preferably between 95° and 150°, more preferably between 100° and 130°, most preferably between 105° and 120°, such as 118°. By preference, one of said sides forming the angle will run parallel to the intersection of said device. The latter has been found advantageous for the positioning of the device to the corner profile.

A second side, equally forming an intersection with said side running parallel to said intersection, will be positioned substantially perpendicular to said parallel side.

Said device will be provided with two leafs, whereby said obtuse angles are placed crosswise or opposite of a virtual symmetric axis formed by the intersection.

When arranging the device to the corner profile, the device may in a first instance be inserted in the corner profile, after which it can be correctly positioned by means of a quarter of a turn or more.

Thickness of the leafs is preferably between 5 and 15 mm, preferably between 8 and 12 mm, more preferably 10 mm. The length of the leaf will preferably be between 100 and 130 mm, more preferably between 105 and 125 mm. Said length of the leafs of the device may vary. This can be necessary in view of the dimensions of a corner profile of a container.

Preferably the intersection will be thicker than said leafs. In a preferred embodiment, said ratio between the thickness of the intersection and the thickness of the leafs will be between 3:1 and 2:1. Said Thickness of the intersection lies preferably between 20 and 30 mm.

Said device will be preferably provided with attachment aids on the rear of said device. Preferably said attachment aids are present on the rear of both leafs. Such attachment aids provide additional assistance for attachment of the device to the corner profile and may comprise a spring or clamping element, magnets or magnetic strips, glue elements. In another embodiment, said attachment aid is a foam element. Said foam element will cover at least partially the rear of said leaf. By preference said, foam element will cover at least 5%, more preferably at least 10%, more preferably 20% of said rear. In another embodiment, said element covers between 1 to 100% of said rear, between 5 to 90%, more preferably between 10 to 90%. Said element may have any conventional shape, such as round, rectangular, square, polygonal.

In a preferred embodiment, said foam element comprises of a closed cell foam, preferably said closed cell foam has ellipsoid or round cells, most preferably round cells. In a further preferred embodiment, said foam element is a cross-linked polyolefin, such as LDPE or PP. Preferred density of the foam will be between 50 and 100 kg/m³. Said thickness of the foam lies preferably between 10 and 30 mm, more preferably between 15 and 25 mm.

Use of foam as attachment aid was found to be particularly useful because of the compressible nature of said foam. This is important, as the space between the device when positioned and the container wall will vary from point to point. Especially the use of foam with round or substantially round cells was found to be extremely advantageous, as these provide sufficient back pressure, even after considerable time of use. Due to its specific nature, said foam element will also resist dimensional changes due to e.g. temperature differences. Said foam element may be attached to the device by conventional methods, such as gluing, or may simply be placed behind said device when being positioned in the corner post.

In a preferred embodiment, said wall securement device can bear a load of at least 6 ton (absolute value) when provided with securing means.

In another aspect, the current invention provides for a container provided by one or more wall securement devices according above-mentioned embodiments.

In a final aspect, the current invention equally provides a kit for securing load in a container. By preference, such kit comprises a wall securement device according to the current invention, securing means such as straps and a buckle for securing said securing means. As outlined above, the straps will by preference comprise polyester yarns, which may be woven polyester yarns or composite polyester yarns embedded in a polymer coating, whereby the polymer coating is polypropylene; polyolefins such as LDPE, HDPE, PP, EVA, EMA, EBA, EEA, etc. Preferably said coating is polypropylene. Other possible straps that can be used in accordance with the current invention comprise polyaramid fibers; nylon; natural fibers such as sisal; flax; and metal fibers.

In general, said straps used in accordance with the current invention are preferably comprised of a material such as polymers with a Young's Modulus lower than 1400 MPa, preferably lower than 1000 MPa, even more preferably lower than 500 MPa.

The kit provides for a buckle for securing the loose ends of the strap, thereby equally securing the load. By preference, such buckle comprises a body having two side walls and bars extending between these side walls. In a preferred embodiment, the bars of the buckle are provided with a peripheral roughening. The buckle is characterized in that at least at one tensioning side of the body the bar or bars are provided with a profile which allows the strap to pass through, and that the least strain on the strap causes the profile to bite into the strap. Due to the two side walls in the body of the buckle the strap is prevented from pulling out of alignment, which may also prevent slipping.

The sought functionality and effectiveness of the buckle according to the invention is in particular facilitated by the fact that at the tensioning side of the buckle, the profile of the bar or bars comprise a serration, and in particular a serration that is oriented opposite to the strap's direction of strain. Advantageously therefore the profile comprises a serration extending over substantially the entire length of the bar or bars.

In a further embodiment, the kit may further comprise a tensioner for applying a tension on said securing means.

The aspects of the current invention will further be elucidated by means of examples and figures, without being limited to these examples or figures.

Figure 3A:
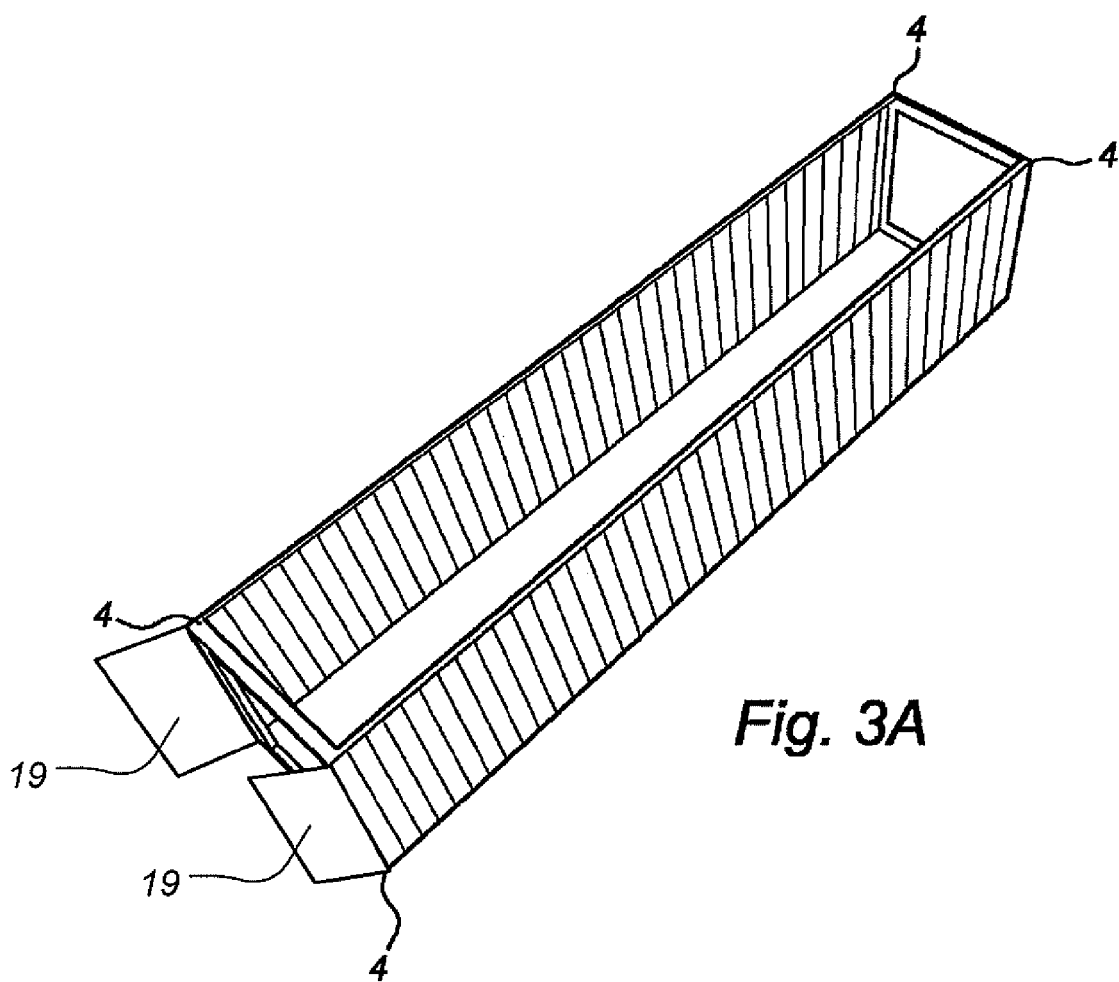
FIG. 3A is a top side view of an example of a container for transporting loads to be used in conjunction with the current invention.

FIG. 1A shows a cross-sectional view of a container carrying a cargo load (11) whereby the cargo load is secured by the method and wall securement device according to the current invention. In particular the container is provided by a total four wall securement devices (1), two by two mounted at the level of the corner posts (4)/corner profiles (13) of the container which are located opposite the doors (19), which is also shown in FIG. 3A. Each of these corner posts (4) will be provided by a top and bottom securement device (1). Additional securement devices (1) may be added, depending on factors such as, for example, the type of cargo, the shape of the cargo, the weight of the cargo, or the like. The straps (10) used for securing the load (11) are passed through a first aperture (2) of the securement device (1) and are subsequently passed through a second aperture (2'), in direction opposite to the first passage of the strap. The strap is retained by means of the intersection (3) of the device (1). The straps are subsequently lashed around the load and will subsequently be attached to the straps coming from the second corner post (not visible on the cross section) whereby they will be joined together and secured by means of a buckle. FIG. 1B shows a detailed view of a corner post (4)/corner profile (13) suitable for receiving a device (1) according to the current invention. The shaded surface (e.g., inner zone of a corner post) represents the optimal position of the device (1) at the corner post. The device (1) may be positioned in the inner zone and not go beyond the inner zone of the corner post, so that it does not interfere with cargo. If not positioned correctly (e.g. outside this position) than the devices risk hindering the load in the container.

Referring to FIGS. 2A to 2F, there are shown various embodiments of the wall securement devices according to the current invention. These devices (1) are all characterized in that they comprise leafs (14, 14') provided by apertures (2), preferably two apertures (2, 2'), which are separated by an intersection (3). The apertures (2, 2') allow passage of the straps (10), whereby the intersection will provide support to the straps. All embodiments show devices with 2 apertures, but it should be understood that multiple apertures, preferable even in number, equally fall under the scope of the current invention.

As shown in FIGS. 2A and 2C, the securement device (1) may be essentially flat, whereby each of the two apertures (2, 2') lie in a virtual plane which forms an angle of 180°. The device may be rectangular or square, and may be provided with rounded corners such as a hysteresis form.

In another embodiment, as shown in FIG. 2B, the securement device (1) may have a curvature.

Figure 2E:
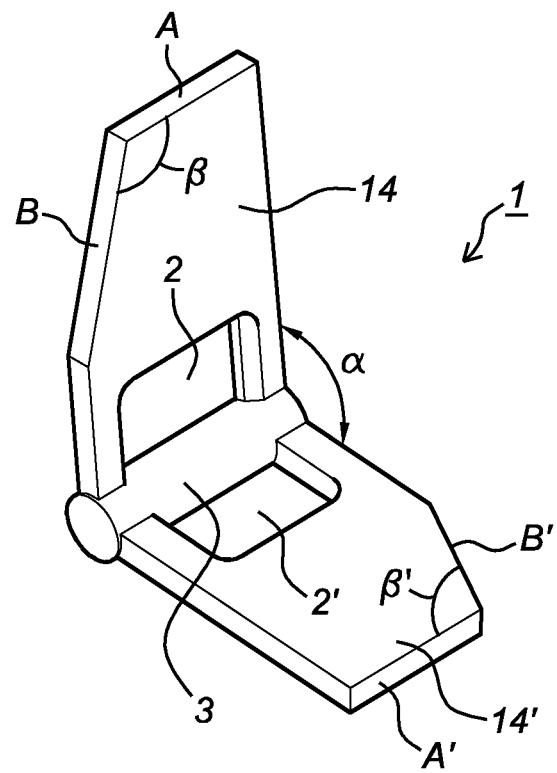

In the embodiments shown in FIGS. 2D and 2E, the leafs form an inner angle which is preferably an obtuse angle. Each of the leafs are provided with an aperture (2, 2').

As shown in FIG. 2E, the leafs (14, 14') are separated by an intersection (3), said intersection (3) has a rod-like appearance.

Each of said leafs (14, 14') is provided with a beveled edge (16), whereby the two intersecting sides A and B (or A' and B') form an angle $\beta$ (or $\beta'$). Said angle $\beta$ is preferably an obtuse angle. Said angles of each leafs are on opposite sides seen from the intersection (3).

Figure 2F:
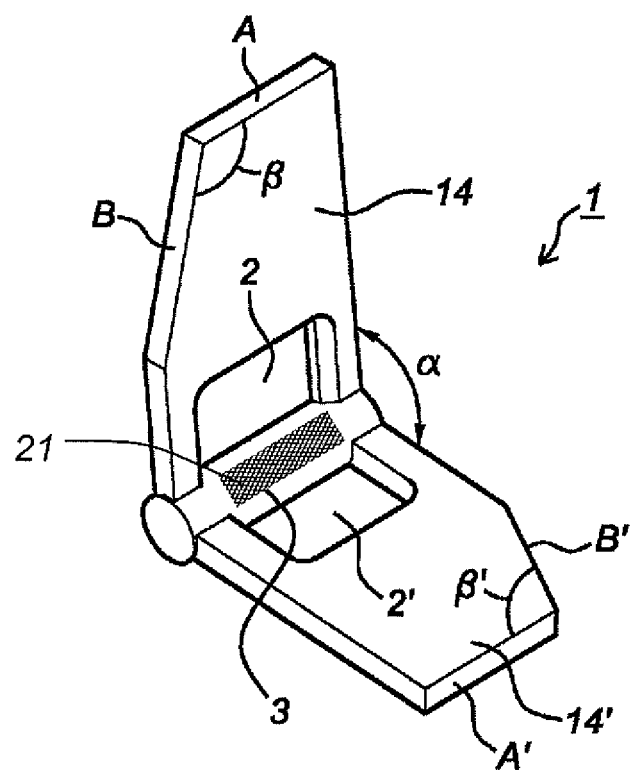

As shown in FIG. 2F, a peripheral roughening 21 may be located at the intersection 3. The peripheral roughening 21 is the same as the peripheral roughening described below with reference to FIGS. 5A, 5B, 6, 7 and 8.

Referring to FIG. 3A, there is shown a top view of a container to be used in conjunction with the current invention. As outlined above containers comprise a steel framework, consisting of four corner posts. The corner posts may be substantially identical in structure, or the corner posts may differ. For instance, the two corner posts at the front (e.g., where the securing device may be positioned) and the rear (e.g., the door-side) may be different. The corner posts (4) serve as the load-carrying elements of containers and in the current invention also as load carrying elements for securement of the load. The steel framework furthermore comprises two bottom side rails, two top side rails, two bottom cross members, a front top end rail and a door header. The side and end walls and the roof are the components of a standard box container which are capable of bearing the least load.

Figure 3B:
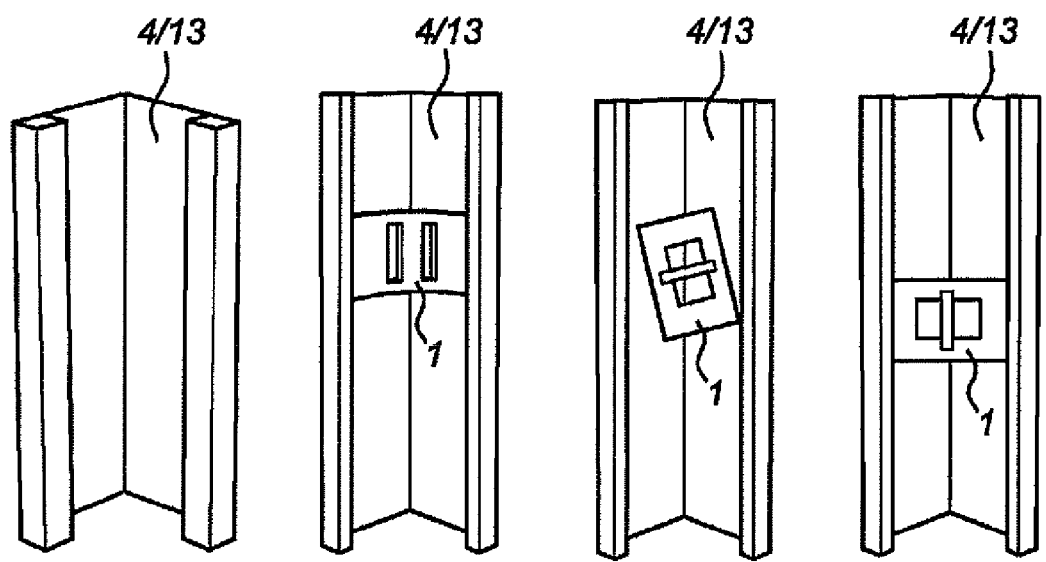

FIG. 3B shows possible ways of how said wall securement device may be attached to the corner posts of the container. The devices may be fixedly or removable attached. Attachment may occur by mechanical means (welding, gluing, magnetism) or by physical means (e.g. by friction).

FIG. 3C shows a detail of a preferred embodiment according to the current invention installed in the corner profile of a corner post. The device (1) is positioned in the corner post, with two sides parallel to the intersection (3) positioned against the wall of the corner post. The device (1) is positioned on a certain distance from the edge of the corner post. The latter is important, as otherwise the device risks to 'escape' the corner post whilst securing the load. Due to the angle formed by the leafs (14, 14') of the device (1), a space between device and wall, suitable for passage of the straps, is formed.

Figure 3D:
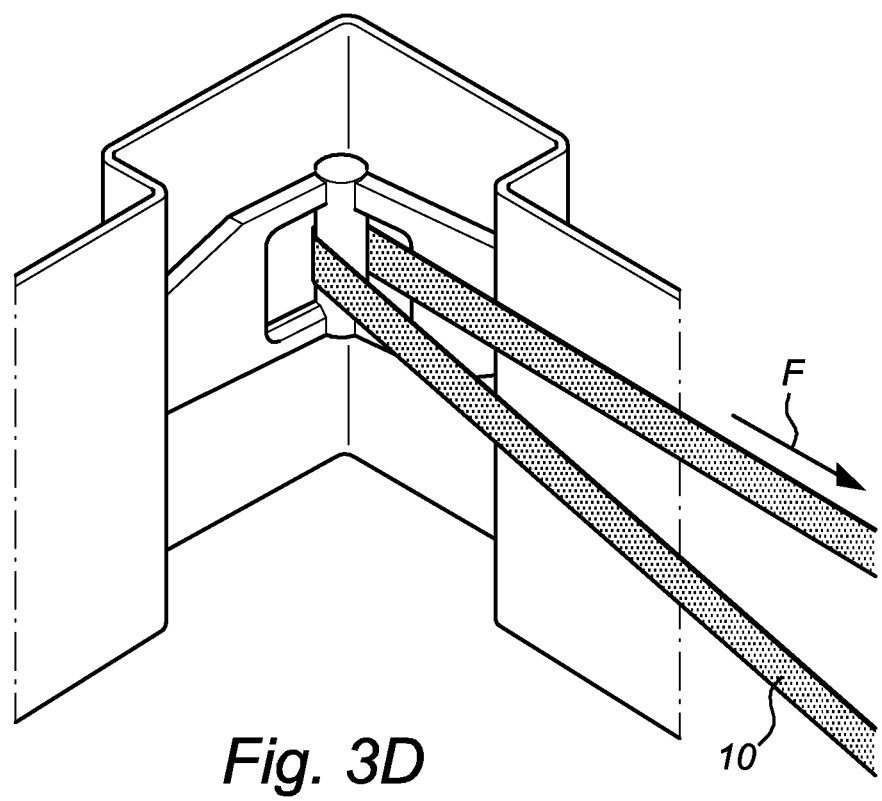
FIG. 3D shows a device according to a possible embodiment of the current invention, placed in a corner post of a container and provided by straps which secure a load.

FIG. 3D shows a device (1) positioned in a corner post used for securing a load with straps. A strap will be brought through the first aperture (2), and secondly through the second aperture (2') in a direction opposite to the direction of the first pathway of the strap. F shows a direction of a force that may be applied to the straps. The force F may be applied in a direction that is opposite to the direction shown in FIG. 3D. Rather than the strap being positioned so that it runs from the interface and to the right of the illustration in FIG. 3D, the strap may be positioned so that it runs from the interface and to the left of the illustration in FIG. 3D. The direction of the applied force F will be equally opposite to the direction of the first when securing a load, the direction of the first strap-pathway.

In order to ensure adequate attaching to the corner post, the device according to the current invention may be provided by attaching aids. As shown in FIG. 4A such attaching means (15) may comprise a metal element, preferably manufactured from spring steel, positioned or attached at the rear of the device (1) and which aids the clamping of the device (1) to the corner profile.

Alternatively, as shown in FIGS. 4B and 4C, the device may be provided with a foam element (15) at the rear side of the device.

Figure 5A:
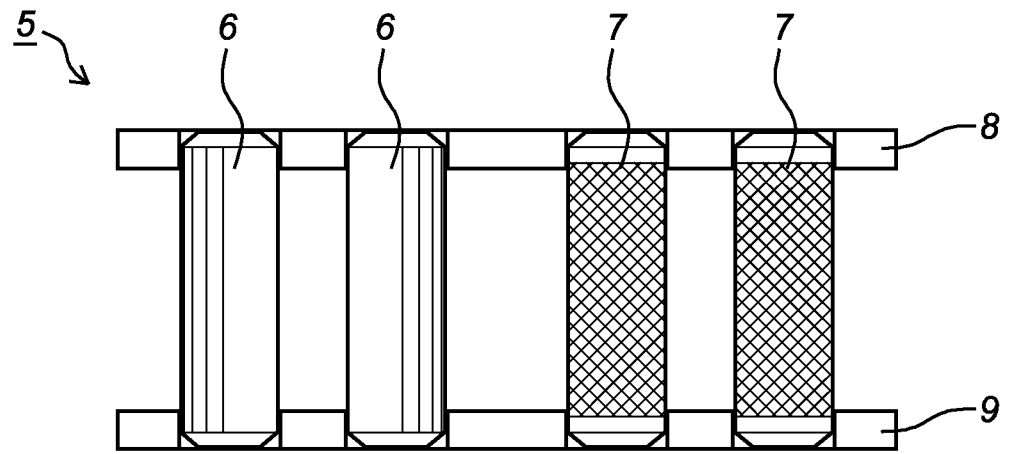
FIGS. 5A and 5B show a top view of two embodiments of a buckle, suitable for use in the current invention.
Figure 5B:
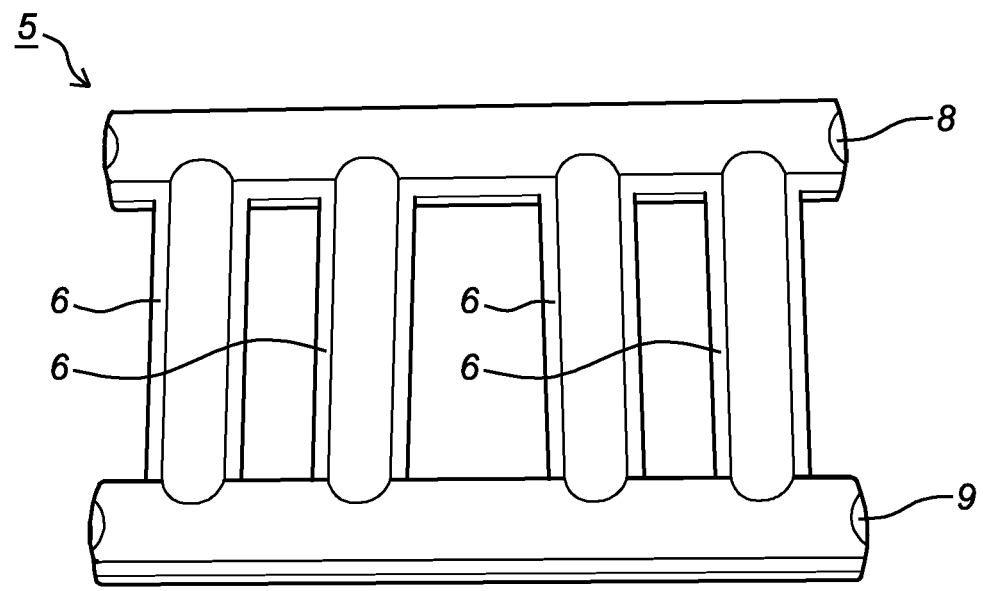

Referring to FIGS. 5A and 5B, where a buckle is shown for securing a strap for goods. The manner in which the strap is passed through the buckle is fully known to the person skilled in the art so that it is not necessary to explain this or to show in the figures how the strap is passed through the buckle.

The buckle (5) shown in FIGS. 5A and B comprises a body that possesses two side walls (8, 9), and bars (6, 7) extending between these side walls (8, 9), which bars are provided with a peripheral roughening (11 or 12).

The buckle is embodied in that the bar or bars are provided at least at the tensioning side of the body, which are provided with a profile such as to allow the strap to pass through, and in particular, such that the least strain on the strap causes the profile of these bars to bite into the strap.

Figure 6:
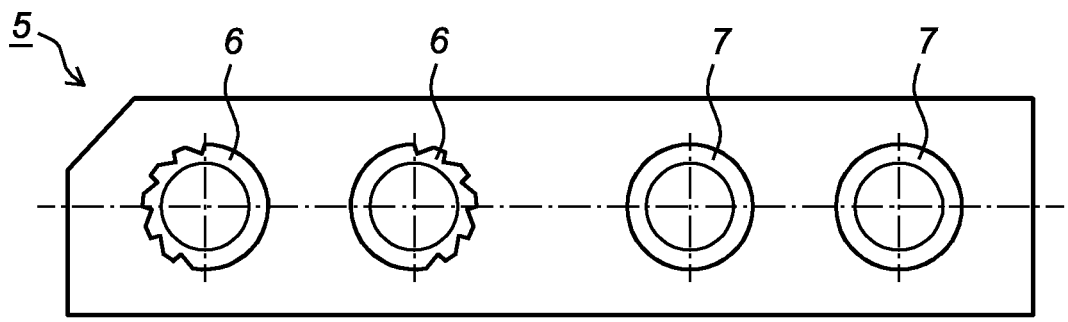
FIG. 6 shows a cross-sectional view of the buckle shown in FIGS. 5A and B.
Figure 7:
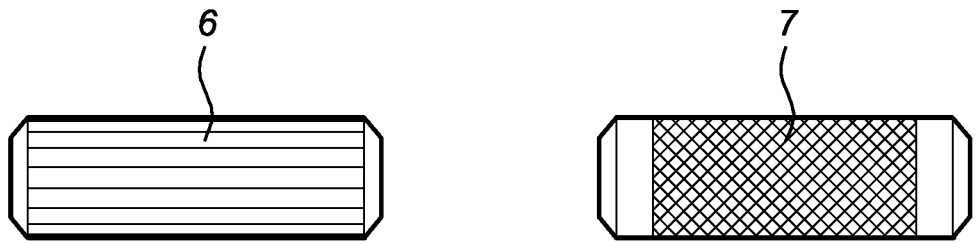
FIG. 7 shows a view of bars of the buckle of FIGS. 5A and B.
Figure 8:
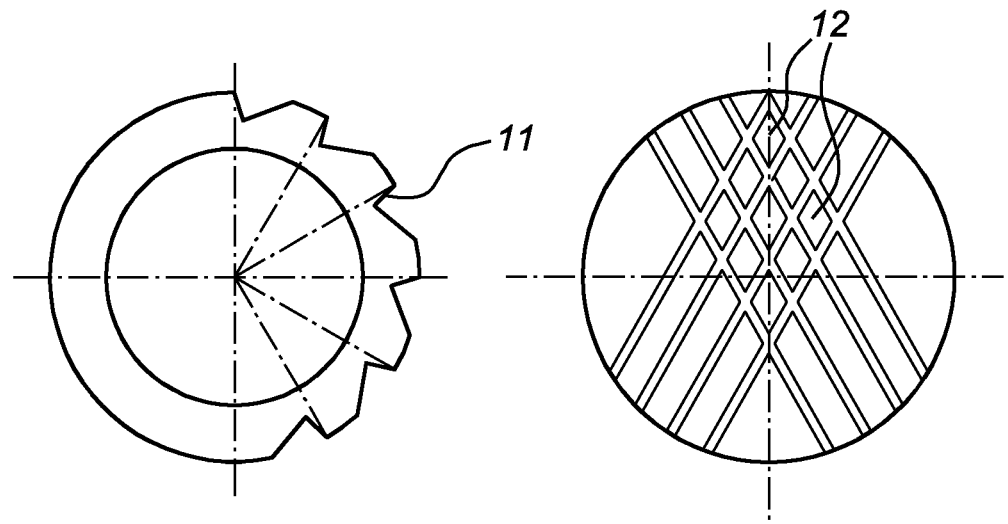
FIG. 8 shows a detail of the surface of the bar shown in FIGS. 5A and B.

The figures, and especially FIGS. 6, 7 and 8, respectively, clearly show that the bars are provided with a peripheral roughening. This applies to the bars 6 as well as to the bars 7.

The roughening on the bars is a positive roughening with respect to the one that is (or may be) provided on the bars, meaning that the profile comprises a serration that is oriented opposite to the strap's direction of strain.

As clearly shown in FIG. 7, the profile of the bars takes the form of a grid (12) whereby the same is provided with a plurality of individual contact surfaces, with each contact surface during use exerting a point load on the strap.

The serration (11) provided on the bars and, as explained above, extending substantially over the entire length of the bar or bars, achieves that the least strain on the strap causes the serration to be pressed into the material of the strap, which prevents the strap from slipping back when a relief moment occurs, as is possible during the transport of a dynamic load.

At the same time, the serration is of such a nature that the strap is simple to fit and easy to pass through the buckle according to the invention without, however, losing the feature of this serration, which engages the strap at the least strain during transport of a load.

The present invention is not restricted to any form of realization described previously and that some modifications can be added to the presented example of fabrication without reappraisal of the appended embodiments.

Example 1

Stability Test

Feasibility was confirmed during a stability test in accordance with ISO 1496-1:2013. During this test the corner profiles of a container were loaded with
  94 ton vertical
  15 ton horizontal Furthermore an additional load at the corner profile was supplied via 2 securing devices according to an embodiment of the current invention.

A maximal force of 6 ton per device was applied without damaging the container corner profile.

Example 2

Securing of a Load

Securing of 18 ton of load (18 filled IBC containers in a setup similar to what is shown in FIG. 1).
  2 securing devices with a Cordstrap composite lashing (CC150UF) with 2 (dynamic load) buckles were positioned at a height of 50 cm and used to secure 10 IBCs which are standing at the container floor
  2 additional devices (1) with a Cordstrap composite lashing (CC150UF) with 2 dynamic load buckles were positioned at a height of 170 cm and used to secure 8 IBC which are standing at a first layer of IBC's A tilting test up to 43° was performed, which corresponds to a force of 0.8 g. The test showed that the cargo was secured properly.

FEATURES RELATING TO THE FIGURES

1: wall securement device
  2: first aperture (2)
  2': second aperture
  3: intersection
  4: corner posts
  5: buckle
  6: bar
  7: bar
  8: side wall
  9: side wall
  10: securing means
  11: serration
  12: grid
  13: corner profile
  14: leaf
  15: attachment aid
  16: beveled edge

The invention claimed is:

1. A method for securing a load in a container that comprises three side walls, a door, a roof, a floor and four corner posts, the method comprising:
  providing a securement device at the corner post of the container, the securement device comprising an aperture that allows passage of a strap; and
  lashing the load to the container by securing the strap to the securement device,
  wherein the securement device comprises a plurality of leafs configured to engage profiles of the corner post, and
  wherein the wall securement device does not extend beyond an inner zone of the corner post.

2. The method according to claim 1, wherein the plurality of leafs of the securement device run substantially perpendicular to the corner post.

3. The method according to claim 1, wherein the three side walls comprise the four corner posts and the securement device is fixedly or removably attached to one of the three side walls.

4. The method according to claim 1, wherein the wall securement device is adjustable in position, and the position includes height.

5. The method according to claim 1, wherein the plurality of leafs of the wall securement device are substantially perpendicular to each other.

6. The method according to claim 1, wherein the wall securement device comprises an intersection configured to hold a portion of the strap.

7. The method according to claim 1, wherein lashing the load comprises passing the strap in a first direction through said aperture of the wall securement device and subsequently through a second aperture of the wall securement device in a direction opposite to the first path.

8. The method according to claim 1, further comprising joining the strap by a buckle.

9. The method according to claim 1, wherein providing the wall securement device comprises locating the wall securement device at a rear wall of the container, opposite to the door of the container.

10. The method according to claim 1, wherein the plurality of leafs comprise two leafs.

11. A wall securement device attachable to an inner rigid structure of a container that comprises a side wall and a corner post to secure a load in the container, the wall securement device comprising:

a plurality of leafs that engage profiles of the corner post; and an aperture that receives a strap to lash the load in the container, wherein the plurality of leafs comprise a pair of leafs that form an inner angle of between about 45° to about 180°, and wherein the wall securement device does not extend beyond an inner zone of the corner post.

12. The wall securement device according to claim 11, wherein the pair of leafs form an inner angle of between about 90° and about 120°.

13. The wall securement device according to claim 11, further comprising an attachment aid that assists in attaching the wall securement device to the corner post.

14. The wall securement device according to claim 13, wherein the attachment aid comprises a foam.

15. The wall securement device according to claim 11, further comprising an intersection that supports a portion of the strap when passed through said aperture, said intersection being placeable in a plane transverse to a direction of strain of the strap.

16. The wall securement device according to claim 11, further comprising a second aperture, wherein the apertures comprise between about 10 and about 80% of the total surface of the wall securement device.

17. The wall securement device according to claim 11, further comprising a second aperture, wherein the apertures comprise between about 25 and about 60% of the total surface of the wall securement device.

18. The wall securement device according to claim 11, further comprising a peripheral roughening.

19. The wall securement device according to claim 18, wherein the peripheral roughening is located on an intersection.

20. A kit attachable to an inner rigid structure of a container that comprises a side wall and a corner post to secure a load in the container, the kit comprising:

a strap that lashes the load in the container; and a wall securement device that attaches to the corner post, the wall securement device comprising:

a plurality of leafs that engage profiles of the corner post; and a plurality of apertures that receive the strap to lash the load in the container, wherein the wall securement device does not extend beyond an inner zone of the corner post.

21. The kit according to claim 20, wherein the strap comprises a material having a Young's Modulus lower than 1400 MPa.

22. The kit according to claim 19, further comprising a buckle that joins the strap.

23. The kit according to claim 19, further comprising a tensioner that applies a tension on the strap.

24. The wall securement device according to claim 11, wherein the wall securement device is a single piece.

* * * * *